(12) United States Patent
Saito

(10) Patent No.: US 8,145,204 B2
(45) Date of Patent: Mar. 27, 2012

(54) COMMUNICATION TERMINAL OUT OF RANGE DETERMINATION METHOD, WIRELESS COMMUNICATION SYSTEM SWITCHING METHOD AND COMMUNICATION TERMINAL

(75) Inventor: Masahiro Saito, Hamamatsu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/826,469

(22) Filed: Jun. 29, 2010

(65) Prior Publication Data
US 2010/0311423 A1 Dec. 9, 2010

Related U.S. Application Data

(62) Division of application No. 10/846,743, filed on May 14, 2004, now Pat. No. 7,801,516.

(30) Foreign Application Priority Data

May 29, 2003 (JP) ................................. 2003-152687

(51) Int. Cl.
*H04M 11/00* (2006.01)
(52) U.S. Cl. ......................... 455/421; 455/436; 455/440
(58) Field of Classification Search .................. 455/421, 455/436, 442, 522, 69, 67.11, 423
See application file for complete search history.

(56) References Cited

U.S. PATENT DOCUMENTS

| | | | |
|---|---|---|---|
| 3,517,315 A | 6/1970 | Malm | 455/70 |
| 4,675,656 A | 6/1987 | Narcisse | 340/539.21 |
| 5,134,708 A | 7/1992 | Marui et al. | 455/421 |
| 5,257,283 A | 10/1993 | Gilhousen et al. | 375/1 |
| 5,267,261 A * | 11/1993 | Blakeney et al. | 370/332 |
| 5,329,635 A * | 7/1994 | Wadin et al. | 455/438 |
| 5,373,548 A | 12/1994 | McCarthy | 455/462 |
| 5,574,982 A | 11/1996 | Almgren et al. | 455/69 |
| 5,603,096 A | 2/1997 | Gilhousen et al. | 455/69 |
| 5,638,412 A | 6/1997 | Blakeney et al. | 375/377 |
| 5,710,981 A | 1/1998 | Kim et al. | 455/69 |
| 5,809,414 A | 9/1998 | Coverdale et al. | 455/421 |
| 5,867,782 A | 2/1999 | Yoon | 455/421 |
| 5,940,743 A * | 8/1999 | Sunay et al. | 455/69 |
| 5,966,656 A | 10/1999 | Elkin et al. | 455/421 |
| 5,995,830 A * | 11/1999 | Amin et al. | 455/423 |
| 6,018,655 A * | 1/2000 | Bartle et al. | 455/421 |
| 6,038,444 A * | 3/2000 | Schipper et al. | 455/421 |
| 6,085,110 A | 7/2000 | Nilsson | 455/552.1 |
| 6,144,858 A | 11/2000 | Masuda | 455/456.3 |
| 6,148,180 A | 11/2000 | Sato | 455/67.7 |
| 6,188,890 B1 | 2/2001 | Chang | 455/421 |
| 6,219,540 B1 | 4/2001 | Besharat et al. | 455/421 |
| 6,330,438 B1 * | 12/2001 | McClelland et al. | 455/421 |
| 6,337,978 B1 | 1/2002 | Inoue | 455/421 |
| 6,349,206 B1 * | 2/2002 | Reichelt et al. | 455/421 |

(Continued)

FOREIGN PATENT DOCUMENTS

JP 07-030483 1/1995

(Continued)

*Primary Examiner* — Sharad Rampuria
(74) *Attorney, Agent, or Firm* — DLA Piper LLP (US)

(57) ABSTRACT

There is provided a communication terminal out of range determination method, a wireless communication system switching method and a communication terminal, capable of determining accurately whether or not a communication terminal is out of range. Determining whether or not the communication terminal is out of range is based on a transmission level of a transmission signal from the communication terminal to a base station.

6 Claims, 2 Drawing Sheets

U.S. PATENT DOCUMENTS

| | | | |
|---|---|---|---|
| 6,484,027 B1 | 11/2002 | Mauney et al. | 455/421 |
| 6,556,822 B1 * | 4/2003 | Matsumoto | 455/421 |
| 6,735,432 B1 | 5/2004 | Jarett et al. | 455/417 |
| 6,909,892 B2 | 6/2005 | Tuji et al. | 455/421 |
| 6,973,303 B1 * | 12/2005 | Meidan | 455/421 |
| 6,983,140 B2 * | 1/2006 | Higuchi | 455/421 |
| 7,042,391 B2 | 5/2006 | Meunier et al. | 342/464 |
| 7,054,631 B2 * | 5/2006 | Tee | 455/436 |
| 7,076,245 B1 | 7/2006 | Satapathy | 455/421 |
| 7,136,665 B2 | 11/2006 | Ida et al. | 455/522 |
| 7,203,487 B2 | 4/2007 | Comp | 455/422.1 |
| 7,215,926 B2 | 5/2007 | Corbett et al. | 455/41.2 |
| 7,231,186 B2 * | 6/2007 | Namiki | 455/67.11 |
| 7,260,401 B2 | 8/2007 | Chen et al. | 455/437 |
| 7,272,399 B2 * | 9/2007 | Han | 455/450 |
| 7,630,707 B2 | 12/2009 | Lee et al. | 455/421 |
| 7,742,761 B2 * | 6/2010 | Taniguchi et al. | 455/421 |
| 7,945,266 B2 * | 5/2011 | Chen et al. | 455/437 |
| 2002/0094782 A1 | 7/2002 | Lin | 455/67.1 |
| 2002/0111158 A1 * | 8/2002 | Tee | 455/421 |
| 2004/0242218 A1 | 12/2004 | Saito | 455/421 |
| 2009/0312005 A1 | 12/2009 | Mukundan et al. | 455/422.1 |

FOREIGN PATENT DOCUMENTS

| | | |
|---|---|---|
| JP | 08-265252 | 10/1996 |
| JP | 10-108262 | 4/1998 |
| JP | 2000-196519 | 7/2000 |
| JP | 2000-201382 | 7/2000 |
| WO | WO 99/31819 A1 | 6/1999 |

\* cited by examiner

COMMUNICATION TERMINAL OUT OF RANGE DETERMINATION METHOD, WIRELESS COMMUNICATION SYSTEM SWITCHING METHOD AND COMMUNICATION TERMINAL

CROSS-REFERENCE TO RELATED APPLICATIONS

This application is a divisional of U.S. application Ser. No. 10/846,743, filed on May 14, 2004, and claims the benefit of priority under 35 USC 119 of Japanese application no. 2003-152687, filed on May 29, 2003, the entire contents of both of which are incorporated herein by reference.

BACKGROUND OF THE INVENTION

1. Field of the Invention

The present invention relates to a communication terminal out of range determination method, which is suitable for determining whether or not a communication terminal is within communicable range.

2. Description of Related Art

With the recently developed Code Division Multiple Access (CDMA) communication method, a base station receives code division multiplexed data transmitted from a mobile terminal such as a portable telephone, and performs despread processing or the like on the received code division multiplexed data, thereby obtaining data on mobile terminals used by individual users. Here, because data transmitted from different mobile terminals uses the same frequency band, this results in interference waves. The degree of interference depends on the transmission power level of the other mobile terminals, and increases as the transmission power levels of other mobile terminals increase. Furthermore, the signal level at the time when the base station receives data transmitted from a mobile terminal, varies according to the distance and geographical features and the like between the base station and the mobile terminal.

In order to solve such problems, the base station instructs each mobile terminal to notify the base station of the received signal level (power level) of the downstream signal transmitted from the base station to the mobile terminals, and controls transmission power so that the signal level of all received data is the same. This transmission power control is described below.

The base station monitors the received signal level (power level) of the downstream signals of each mobile terminal, transmitted from each mobile terminal. If the received downstream signal level falls below a constant, the base station determines that the state of communication between a given mobile terminal and the base station is impaired (for example, because of long distances between the mobile terminal and the base station, the mobile terminal being used behind a shielding object, or an increase in interference).

In order to stay in communication with that mobile terminal, the base station then issues an instruction to the mobile terminal to increase transmission output level. Upon receiving this instruction, the mobile terminal raises its transmission signal output level (transmission power level) by one level, for example, and tries to stay in communication with the base station. The continuation of this exchange between the base station and the mobile terminal constitutes the transmission power control.

Furthermore, the mobile terminal monitors the received signal level for when data transmitted from the base station is received, and determines the state of communication between the base station and the mobile terminal, based on this received signal level. The mobile terminals then displays the thus determined state of the communication on a screen in the form of an antenna symbol, for example, to notify the user of the state of the communication.

Furthermore, if the mobile terminal receives data transmitted from the base station at a received signal level which is below a certain threshold, then the mobile terminal determines that the mobile terminal cannot stay in communication with the base station, that is, the mobile terminal is out of range. The mobile terminal then displays on the screen that the mobile terminal is now out of range.

The matters described above are disclosed in Japanese Unexamined Patent Application, First Publication No. 2000-196519.

Incidentally, if the so-called upstream communication method for when the data is transmitted from the mobile terminal to the base station, and the so-called downstream communication method for when the data is transmitted from the base station to the mobile terminal are the same, then provided that the receiver sensitivity does not differ greatly between the base station and the mobile terminal, the conventional out of range determination method above can be used to determine with a degree of precision when a mobile terminal is out of range.

However, in this conventional out of range determination method, if the upstream and downstream communication methods differ, then for each communication method the characteristics such as strength and reflection differ with respect to radio interference and shielding materials. For example, if the downstream method is a Time Division Multiple Access (TDMA) communication method and the upstream method is the CDMA communication method, then there is the possibility that although the signal of the downstream TDMA method is able to reach the mobile terminal from the base station, the signal of the upstream CDMA method is not able to reach the base station from the mobile terminal. Therefore, in such a case, communication may not be able to be maintained between the mobile terminal and the base station. Also if the downstream method is the CDMA communication method and the upstream method is the TDMA communication method, the same would apply, namely that communication cannot be achieved between the mobile terminal and the base station.

In other words, with conventional communication methods, if the communication methods for upstream and downstream differ, then it is impossible to determine accurately whether a mobile terminal is out of range based only on the receiver sensitivity (downstream signal reception level) of the mobile terminal.

SUMMARY OF THE INVENTION

In accordance with the above circumstances, an object of the present invention is to provide a communication terminal out of range determination method, a wireless communication system switching method and a communication terminal, capable of determining accurately whether or not a communication terminal is out of range.

Furthermore, an object of the present invention is to provide a communication terminal out of range determination method, a wireless communication system switching method and a communication terminal, capable of determining accurately whether or not a communication terminal is out of range even when the upstream and downstream communication methods are different.

Moreover an object of the present invention is to provide a communication terminal out of range determination method, a wireless communication system switching method and a communication terminal, capable of beginning to prepare to switch from a current communication method to another communication method based on an upstream transmission signal level.

In order to achieve these objects, a communication terminal out of range determination method according to the present invention comprises the step of determining whether or not a communication terminal is out of range, based on a level of transmission signals from the communication terminal to a base station.

A communication terminal out of range determination method according to the present invention comprises the step of determining that a communication terminal, which controls a transmission level based on control information received from a base station so that a level of signals received by the base station becomes a reference level, is out of range, when the communication terminal receives the control information from the base station, despite the communication terminal transmitting at a level which exceeds a predetermined threshold.

A communication terminal according to the present invention comprises: a transmission unit which transmits signals to a base station; a detection unit which detects a level of the signals transmitted by the transmission unit; and a determination unit which determines whether or not the communication terminal is out of range based on the level of the signals detected by the detection unit.

A communication terminal according to the present invention comprises: a transmission unit which transmits signals to a base station; a control unit which controls a level of the signals transmitted by the transmission unit based on control information received from the base station so that a level of signals received by the base station becomes a reference level; a storage unit which stores a predetermined threshold value; and a determination unit which determines that the communication terminal is out of range when the control information is received from the base station despite the transmission unit transmitting at a level which exceeds the threshold value.

According to these aspects of the invention, it is possible to determine accurately whether or not a communication terminal is out of range.

Furthermore, according to these aspects of the invention, it is possible to determine accurately whether or not a communication terminal is out of range, even when the upstream and downstream communication methods between the communication terminal and the base station are different.

A wireless communication system switching method according to the present invention in a communication terminal capable of connecting to a plurality of different wireless communication systems comprises the steps of: determining whether or not the communication terminal is out of range based on a level of transmission signals from the communication terminal to a base station, and if determined to be out of range, beginning preparation for connecting to a different wireless communication system from the wireless communication system to which the communication terminal is connected.

A communication terminal according to the present invention comprises: a communication unit capable of connecting to a plurality of different wireless communication systems; a detection unit which detects a level of signals transmitted by the communication terminal; a determination unit which determines whether or not the communication terminal is out of range based on the level of the signals; and a switching unit which, if the determination unit has determined that the communication terminal is out of range, begins preparation for connecting to a different wireless communication system from the wireless communication system to which the communication terminal is connected.

According to these aspects of the invention, it is possible to begin preparation for switching from the communication system currently being used between the communication terminal and the base station, to a different communication system, based on the transmission level of the upstream communication signal, and thus reduce problems such as interruptions to communication.

DETAILED DESCRIPTION OF THE INVENTION

As follows is a description of a communication terminal and a communication terminal out of range determination method according to an embodiment of the present invention, with reference to the drawings.

Figure 1:
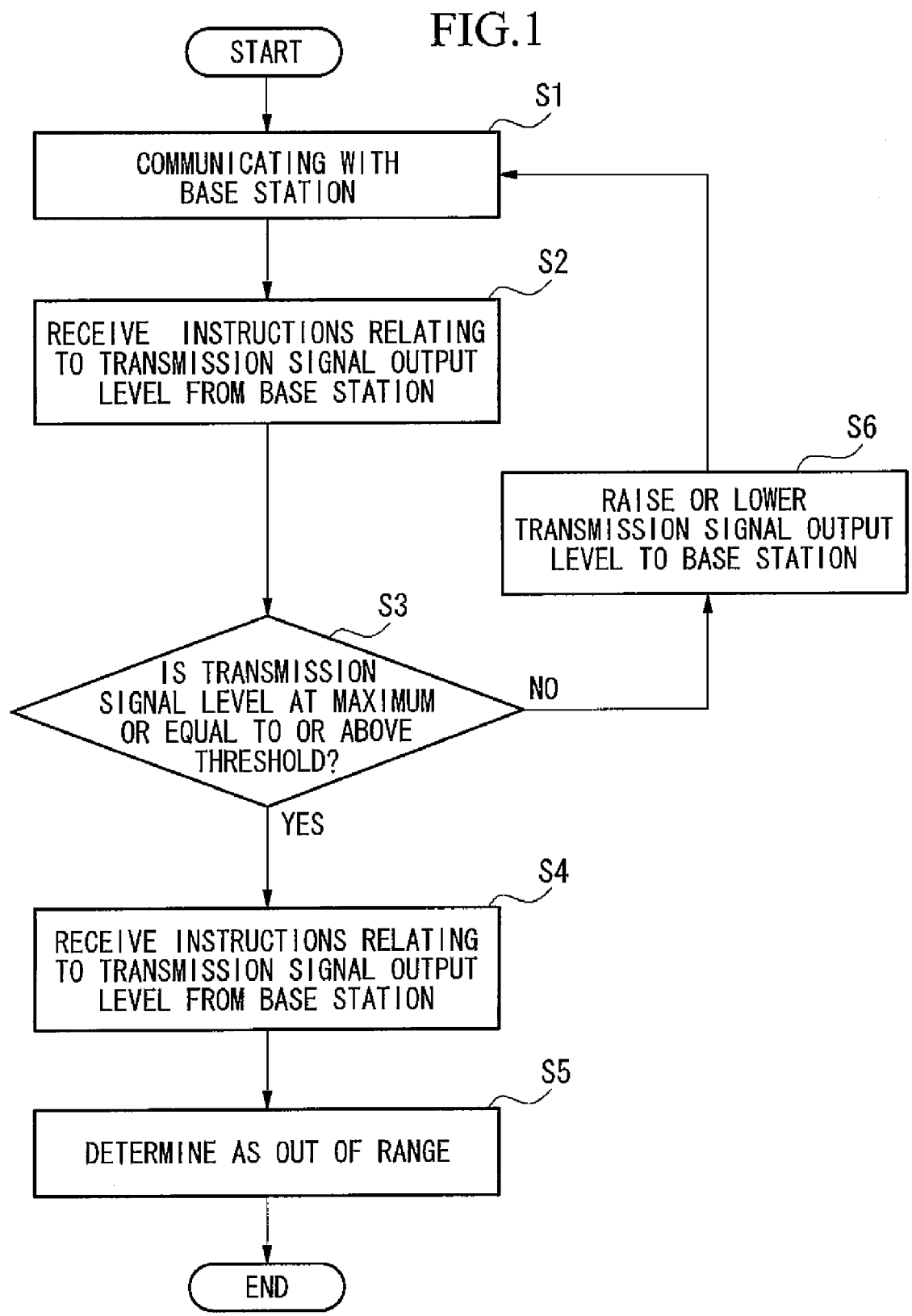
FIG. 1 is a flow chart showing a communication terminal out of range determination method according to an embodiment of the present invention.

FIG. 1 is a flow chart showing a communication terminal out of range determination method according to the embodiment of the present invention. This flow chart shows a method for determining whether or not a communication terminal is out of range, in a communication system which includes a communication terminal such as a portable telephone, and a base station.

Figure 2:
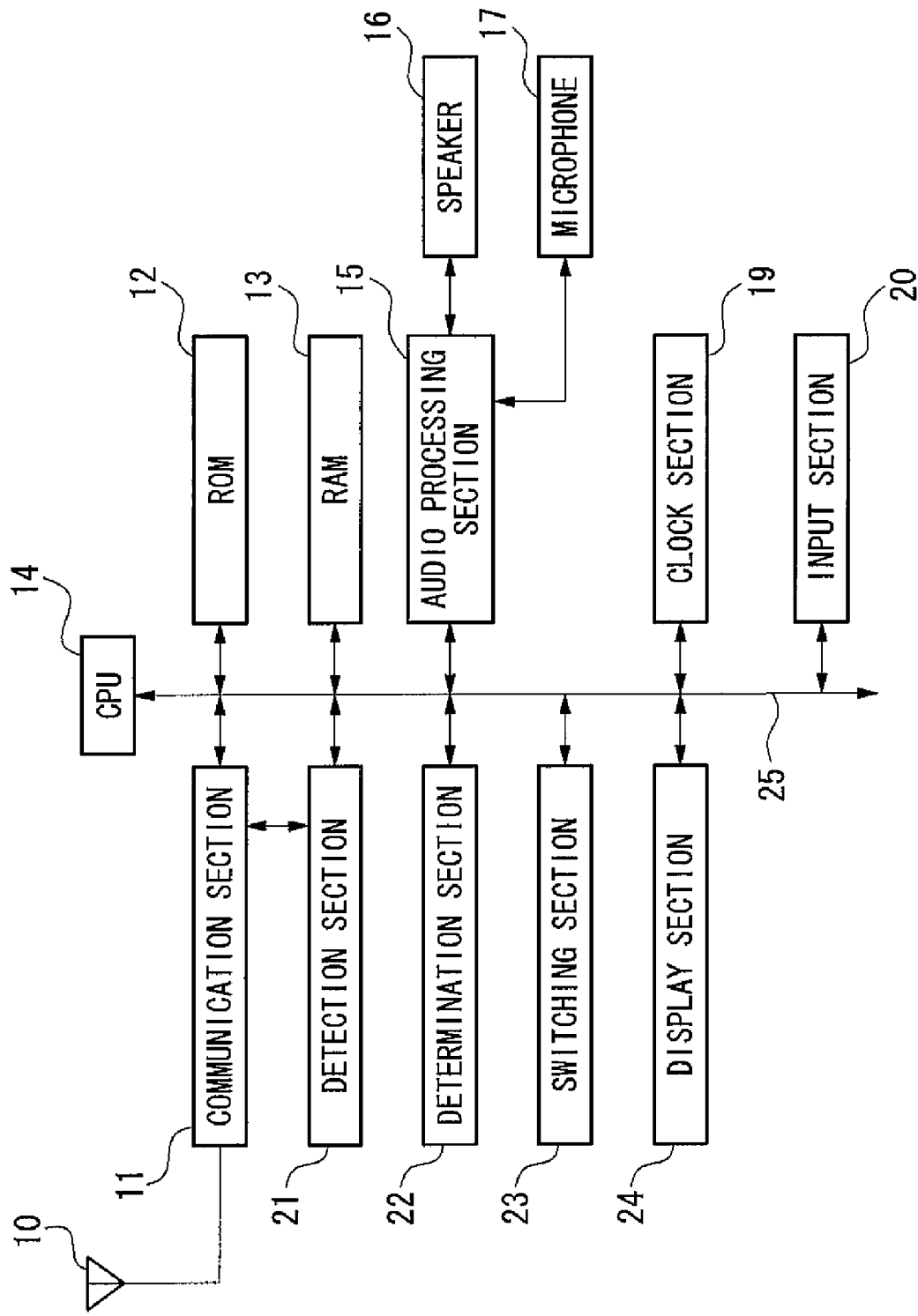
FIG. 2 is a block diagram showing the configuration of a communication terminal according to the embodiment of the present invention.

First, a communication terminal to which the communication terminal out of range determination method according to the present embodiment is applied, is described with reference to FIG. 2. FIG. 2 is a block diagram showing the configuration of a communication terminal according to the embodiment. This communication terminal is provided with; an antenna 10, a communication section 11, a ROM (Read Only Memory) 12, a RAM (Random Access Memory) 13, a CPU 14, an audio processing section 15, a speaker 16, a microphone 17, a clock section 19, an input section 20, a detection section 21, a determination section 22, a switching section 23, and a display section 24. The communication section 11, the ROM 12, the RAM 13, the CPU 14, the audio processing section 15, the clock section 19, the input section 20, the detection section 21, the determination section 22, the switching section 23 and the display section 24 are connected via a bus 25.

The communication section 11 constitutes a transmission device which transmits signals to a base station via the antenna 10, and also constitutes a receiver device which receives signals output from the base station, via the antenna 10. The detection section 21 constitutes a detection device which detects the transmission level (output level) of transmission signals from the communication section 11. The determination section 22 constitutes a determination device which determines whether or not a communication terminal is out of range, based on the transmission level detected by the detection section 21.

The CPU 14 constitutes a control device which controls the operation of the communication terminal based on programs stored in the ROM 12, and controls the transmission level of the communication section 11 based on control information from the base station so that the reception level received by the base station becomes a reference level.

The ROM 12 constitutes a storage device which stores a variety of programs, and stores a predetermined threshold for the transmission level of the communication section 11. The RAM 13 is a storage device to and from which a variety of data is temporarily written and read. The predetermined threshold may also be stored in the RAM 13.

Furthermore, the determination section 22 preferably determines that the communication terminal is out of range when information for controlling the transmission level is received from the base station despite already transmitting at a transmission level which exceeds the predetermined threshold.

When the determination section 22 determines that the communication terminal is out of range, the switching section 23 begins preparation for connecting to a different wireless communication system (wireless communication method) from that to which the communication terminal is connected.

The audio processing section 15 synthesizes audio data and the like output from the CPU 14, converts the data to an analog signal, and outputs the results. The speaker 16 outputs the analog signal output from the audio processing section 15, as audio. The microphone 17 converts audio from an external source to an analog signal and outputs the signal. Furthermore, the audio processing section 15 converts the analog signal output from the microphone 17 to a digital signal and outputs the converted signal. The clock section 19 measures time. The input section 20 is an operation device allowing a user to issue a variety of instructions to the communication terminal, and comprises number keys, symbol keys, function keys and the like. The display section 24 displays a variety of information according to the instructions of the CPU 14.

Next, the communication terminal out of range determination method according to an embodiment of the present invention is described, with reference to FIG. 1. The flow chart in FIG. 1 shows the communication terminal out of range determination method according to the embodiment of the present invention, and also shows the operation of the communication terminal.

First, an assumption is made that the communication terminal and the base station are communicating with each other (step S1).

In this embodiment, an assumption is made that in the communication between the communication terminal and the base station, the upstream communication method (first communication method) used in the transmission of signals from the communication terminal to the base station, and the downstream communication method (second communication method) used in the transmission of signals from the base station to the communication terminal, are different communication methods. For example, the upstream communication method may be CDMA, and the downstream communication method may be TDMA.

Then, by means of transmission power control from the base station, the communication terminal receives instructions from the base station relating to the transmission level (transmission signal level) of the signals transmitted by the communication terminal (step S2).

In this step S2, if the communication terminal enters the shade of a shielding material, for example, and the state of communication is impaired, then the communication terminal receives from the base station an instruction to raise the transmission level of the transmission signal. On the other hand, if the communication terminal and the base station are extremely close together, for example, the communication terminal receives from the base station an instruction to lower the transmission level of the transmission signal.

In the communication terminal, a determination is then made by the determination section 22 as to whether or not the transmission level detected by the detection section 21 is at maximum value or equal to or above a predetermined threshold (step S3).

If the result of the determination in step S3 is "No", then the communication terminal either raises or lowers the transmission level of the transmission signals transmitted to the base station, according to the instructions from the base station (step S6).

After step S6 is performed, the process returns to step S1.

If the result of the determination in step S3 is "Yes", the communication terminal may still receive instructions from the base station to raise the transmission level of the transmission signal (step S4).

That is, even though the transmission level of the transmission signals (upstream signals) of the communication terminal is at the maximum value, or has exceeded a predetermined threshold value, the communication terminal receives further instructions from the base station to raise the transmission level.

If this situation described for step 4 is encountered, then the determination section 22 of the communication section determines that the upstream signal from the communication terminal to the base station is not reaching the base station, and determines that the communication terminal is out of range (step S5).

Furthermore, the communication terminal may also monitor whether or not the reception level of the downstream transmission signal transmitted from the base station to the transmission terminal is below a constant; and if the reception level is below the constant, the determination section 22 may then determine that the communication terminal is out of range.

As a result, according to the communication terminal out of range determination method of the present embodiment, because out of range determination is performed based on the transmission level of the signals transmitted by the communication terminal (the upstream signal), it is possible to determine accurately whether or not the communication terminal is out of range.

Furthermore, according to the communication terminal out of range determination method of the present embodiment, by performing out of range determination based on the transmission level of the signal transmitted by the communication terminal (upstream signal) and the reception level of the downstream signal transmitted from the base station to the communication terminal, even if the upstream communication method and the downstream communication method differ, it is possible to determine with greater accuracy whether or not the communication terminal is out of range.

Next, a wireless communication system switching method according to another embodiment of the present invention is described with reference to FIG. 2. This wireless communication system switching method enables switching between a plurality of different wireless communication systems (or communication methods) between a base station and a communication terminal. That is to say, this method can be applied to a communication terminal and communication system which has a switching section 23.

For example, assume a communication terminal is connected to a wireless communication system (a first communication system) in which the upstream method is the CDMA method and the downstream method is the TDMA method, and the communication terminal can switch to a second communication system by means of the switching section 23.

For example, when the communication terminal, and base station are communicating using the first communication system, and the transmission signal level of the upstream signal of the first communication system exceeds a predetermined threshold, the determination section 22 makes a determination that the communication terminal is out of range. The switching section 23 then begins preparation for establishing a connection between the communication terminal and the base station using the second communication system.

As a result, with the present embodiment, it is possible to begin preparing for switching to another wireless communication system by means of the switching section 23 or the like if the communication terminal looks to soon be out of range or is out of range. Therefore, it is possible to determine accurately when a communication terminal is out of range in the active wireless communication system, and reduce interruptions to communication, such as during phone calls.

The embodiments of the present invention have been described above with reference to the drawings, but the specific construction of the present invention is not limited to these embodiments, and design changes within a scope which does not depart from the gist of the invention are also included.

In the embodiments above, a portable telephone was cited as an example of a communication terminal, but the present invention is not limited thereto, and the communication terminal (terminal) of the present invention may apply to a PHS (Personal Handyphone System), personal computer, PDA (Personal Digital Assistants) or the like.

The communication terminal out of range determination method of the embodiments may also be realized by an out of range determination program which executes the communication terminal out of range determination method on a computer. Furthermore, this communication terminal out of range determination program may be stored in a storage device on a computer, and transmitted to other computers via a transmission medium, or via transmitted waves within a transmission medium. Here, the transmission medium for transmitting the program refers to a medium which has the function of transmitting information, for example networks such as the Internet, and communication lines such as telephone lines. Furthermore, the out of range determination program may realize only a portion of the steps (functions) described above. In addition, the out of range determination program may also act as a so-called differential file (differential program), which realizes the steps (functions) described above in conjunction with programs already stored on the computer.

What is claimed is:

1. A wireless communication system switching method in a communication terminal capable of connecting to a plurality of different wireless communication systems comprising:
   determining whether or not the communication terminal is out of range based on a transmission level of the communication terminal and a received instruction; and
   beginning preparation for switching to a different wireless communication system from the wireless communication system to which the communication terminal is connected according to a determination that the communication terminal is out of range.

2. The wireless communication system switching method according to claim 1, wherein the transmission level is a transmission power level.

3. The wireless communication system switching method according to claim 1, wherein determining whether or not the communication terminal is out of range further comprises determining whether or not the communication terminal is out of range based on a reception level when the communication terminal receives from a base station.

4. A communication terminal comprising:
   a communication unit capable of connecting to a plurality of different wireless communication systems;
   a detection unit which detects a transmission level of the communication terminal;
   a determination unit which determines whether or not the communication terminal is out of range based on the transmission level and a received instruction; and
   a switching unit which begins preparation for switching to a different wireless communication system from the wireless communication system to which the communication terminal is connected according to a determination by the determination unit that the communication terminal is out of range.

5. The communication terminal according to claim 4, wherein the transmission level is a transmission power level.

6. The communication terminal according to claim 4, further comprising:
   a reception unit which receives from a base station, wherein
   the detection unit detects a reception level on the reception unit, and
   the determination unit determines whether or not the communication terminal is out of range based on the transmission level and the reception level.

* * * * *